United States Patent [19]

Yamamoto et al.

[11] 4,220,980
[45] Sep. 2, 1980

[54] TRIMMER CAPACITOR

[75] Inventors: Takami Yamamoto, Muko; Yukihiro Azuchi, Nagaokakyo, both of Japan

[73] Assignee: Murata Manufacturing Co., Ltd., Japan

[21] Appl. No.: 935,264

[22] Filed: Aug. 21, 1978

[30] Foreign Application Priority Data

Sep. 1, 1977 [JP] Japan .............................. 52-118353[U]

[51] Int. Cl.³ .............................................. H01G 5/06
[52] U.S. Cl. ..................................... 361/293; 361/278
[58] Field of Search ........................ 361/292, 293, 278

[56] References Cited

U.S. PATENT DOCUMENTS 2,913,645  11/1959  Hanser .................................. 361/293
3,681,828  8/1972  Mezey .................................. 361/293

*Primary Examiner*—E. A. Goldberg
*Attorney, Agent, or Firm*—Ostrolenk, Faber, Gerb & Soffen

[57] ABSTRACT

A trimmer capacitor is disclosed. This trimmer capacitor comprises a rotor, a stator, a stator electrode formed in a predetermined pattern on a portion of the stator, and a stator terminal extending outward from the stator for external connection of the stator electrode. Preferably, the stator electrode and a conductive portion extending from the stator electrode to the stator terminal are formed inside of the outer periphery of the stator.

9 Claims, 7 Drawing Figures

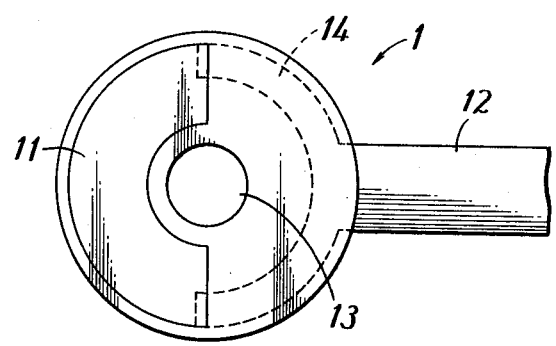
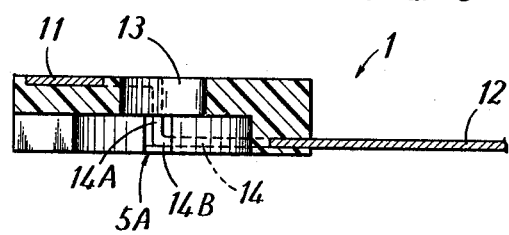
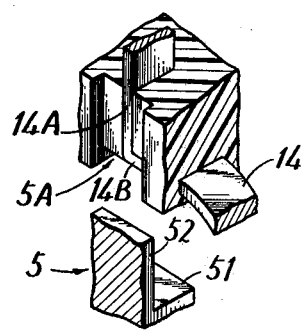
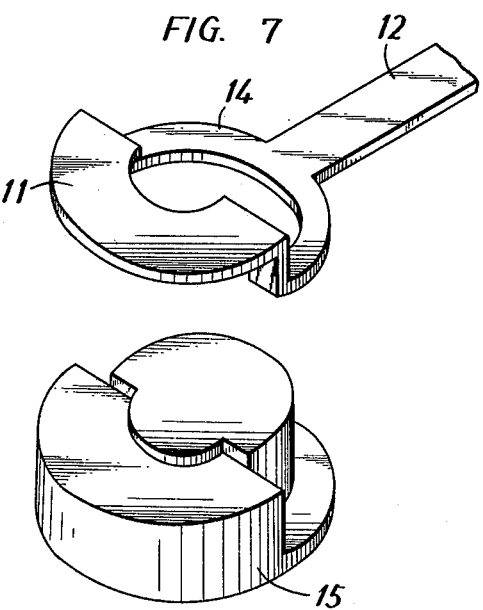

TRIMMER CAPACITOR

BACKGROUND OF THE INVENTION

1. Field of the Invention

The present invention relates to a trimmer capacitor, and more specifically to an improvement for increasing the strength associated with a stator electrode formed on a stator and a stator terminal for external connection from the stator electrode.

2. Description of the Prior Art

FIG. 1 shows a sectional view of one example of a conventional trimmer capacitor. The trimmer capacitor shown comprises a fixed stator 1 and a movable rotor 2. The stator 1 is provided with a stator electrode 11 formed in a fan pattern, for example, on the surface of the stator 1 and a stator terminal 12 is provided so as to extend from the stator electrode 11. The stator electrode 11 and the stator terminal 12 are fabricated as an unitary member from a conductive material. The rotor 2 comprises a dielectric member 22 (which may be ceramic) and also comprises a internal electrode 21 formed, by way of example, in a fan pattern inside of the rotor 2. In order to prevent, warp caused by a firing process of the dielectric member 22 an idling electrode 23 is formed on the portion where the internal electrode 21 is not formed. A rotor 2 of the foregoing type wherein the electrode 21 is formed with in the rotor 2 is often referred to as a layered rotor. The stator 1 and the rotor 2 have central holes 13 and 24, respectively, formed therein. The internal side surface of the central hole 24 of the rotor 2 is formed of a metallized portion 42 such as silver for electrical conduction to the inner diameter side edge of the internal electrode 21. A shaft portion 33 of a central shaft 3 is inserted through the central hole 24 of the rotor 2 and the central hole 13 of the stator 1. A solder 43 is filled into a space formed between the metallized portion 42 and the shaft portion 33 and serves to fix the rotor 2 to the central shaft 3 with the internal electrode 21 being electrically connected to the central shaft 3. An adjusting groove 32 is formed in the upper surface of a top portion 31 of the central shaft 3. The angular orientation of the shaft 3 may be adjusted by inserting a tip end of a screw driver and rotating the shaft 3. A spring member 41 is placed over the shaft portion 33 of the central shaft 3 and is held in position by a caulked portion 34 formed on the end of shaft portion 33. The spring member 41 urges the rotor 2 into close contact with the stator 1 and includes an extension portion 4 which defines a rotor terminal. In the trimmer capacitor thus obtained, the stator electrode 11 is externally connected by the stator terminal 12, while the internal electrode 21 is externally connected through the metallized portion 42, the solder 43 and the central shaft 3 to the rotor terminal 4. A static capacitance is formed between the stator electrode 11 and the internal electrode 21. This static capacitance may be varied by rotating the central shaft so as to adjust the angular orientation of rotor 2 with respect to the stator 1.

When the above described trimmer capacitor is mounted on a base plate, the stator terminal 12 and the rotor terminal 4 extend laterally from the trimmer capacitor and serve as a support therefor. As a result, when the capacitance of the trimmer capacitor is adjusted by inserting the tip end of a driver into the adjusting groove 32 and rotating the central shaft 3, both terminal 12 and 4 are subjected to relatively large counterforces. The above described force has a particularly adverse affect on the stator terminal 12. This force will be described in more detail with reference to FIGS. 2 and 3.

FIG. 2 shows a plan view of only the stator 1 in FIG. 1, and FIG. 3 shows a central longitudinal section of the same. When a trimmer capacitor is miniaturized, the stator 1, as shown, is accordingly miniaturized. The stator 1 is formed by molding a resin after inserting the unitary member including the stator electrode 11 and the stator terminal 12. Thus, it will be appreciated that when the stator 1 is miniaturized, the amount of molding resin for enclosing the stator electrode 11 and the stator terminal 12 accordingly decreases. Therefore, the above described counter force exerted on the stator terminal 12 can cause a portion A, for example, of the stator 1 to break off. The stator electrode 11 may then be raised with the result that the capacitance of the trimmer capacitor may vary. These problems are compounded when the stator 1 is miniaturized by thinning the stator 1.

BRIEF SUMMARY OF THE INVENTION

Accordingly, a principal object of the present invention is to provide a trimmer capacitor wherein the above described problems are eliminated.

In summary, the present invention is directed to a trimmer capacitor wherein an influence of any force from a stator terminal upon a stator electrode is minimized and the strength associated with the stator terminal is increased, by providing a stator wherein the stator terminal is led out in the direction opposite to the side where the stator electrode is formed. Preferably, the stator electrode and an electrically conductive portion extending from the stator electrode to the stator terminal are formed so as not to protrude from the outer periphery of the stator.

The other objects and features of the present invention will become more apparent from the following detailed description when taken in conjunction with the accompanying drawings.

BRIEF DESCRIPTION OF THE DRAWINGS

FIG. 4 is a plan view showing a stator 1 constituting a major portion of one embodiment of the present invention;

FIG. 5 is a central longitudinal section thereof;

FIG. 6 is a pespective view of a major portion for explaining a preferred molding process of a stator 1 shown in FIGS. 4 and 5; and FIG. 7 is a perspective view of a disassembled state of a stator constituting a major portion of an alternative embodiment of the present invention.

DESCRIPTION OF THE PREFERRED EMBODIMENTS

Figure 1:
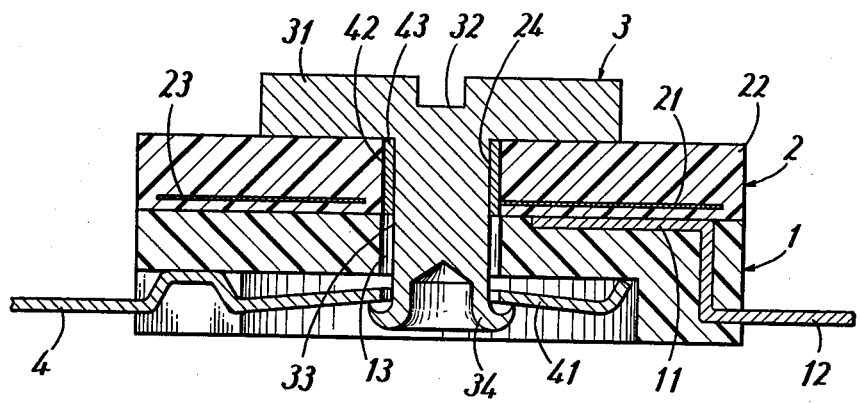
FIG. 1 is a sectional view showing one embodiment of a conventional trimmer capacitor.
Figure 2:
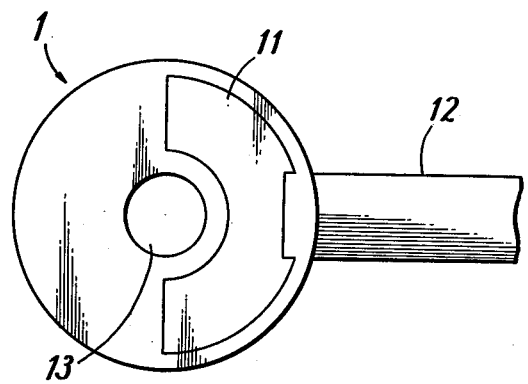
FIG. 2 is a plan view showing only a stator 1 in FIG. 1.
Figure 3:
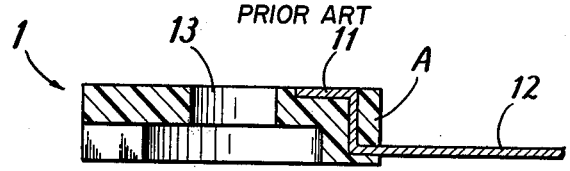
FIG. 3 is a central longitudinal section thereof.

FIG. 4 shows a plan view of a stator 1 constituting a major portion of one embodiment of the present invention. FIG. 5 is a central longitudinal section of the same. It is pointed out that in FIGS. 4 and 5 the same reference numerals as those shown in FIGS. 1 to 3 have been used to denote like elements. It is further pointed out that the stator 1 shown is obtained through molding of resin.

As shown in FIGS. 4 and 5, a stator terminal 12 is connected to the outer periphery of both ends of a fan shaped stator electrode 11 by a semicircular and bifurcated electrically conductive portion 14. The electrically conductive portion 14 enables makes it possible to locate the stator electrode 11 and the stator terminal 12 on opposite sides of the stator 1. As a result of this structure, any forces applied to the stator terminal 12 have very little effect on the stator electrode 11 and, accordingly, there is only a remote chance that the stator electrode 11 will be raised by forces exerted on the stator terminal 12. Since the conductive portion 14 is embedded in the resin constituting the stator 1 over a long distance, the strength associated with the stator terminal 12 is increased.

The above described stator 1 is fabricated by inserting an unitary member, including the stator electrode 11, the conductive portion 14 and the stator terminal 12 in position in a mold for a molding operation and by intergrally molding with resin. According to a simple process, an insert molding operation is effected, with only the stator terminal 12 positioned. However, according to the above described simple process, it is possible that the stator electrode 11 will slip out of place in the mold. If the stator 1 is molded with the stator electrode out of place, it is possible for the stator electrode 11 or the conductive portion 14 protrude from the outer periphery of the stator 1. Clearly, the use of such a trimmer capacitor (having the stator 1 with the above described defect) could cause electrical problems in the event of a contact with other components. Hence, it is preferred that the stator electrode 11 and the conductive portion 14 do not protrude from the outer periphery of the stator 1. To avoid this problem, it is preferable that the following molding process be employed.

Referring now to FIG. 6, there is shown a protrusion 5 which is used in connection with the preferred process for molding the stator 1. Protrusion 5 is shown opposite a portion of the mold used in connection with the molding process. The protrusion 5 coacts with a portion 14A of the conductive portion 14 extends downward from the end portion of the stator electrode 11 and also coacts with the portion 14B extending from the portion 14A in the horizontal direction. Although only one protrusion is shown in FIG. 6, two protrusions 5 are provided to coact with the respective ends of the bifurcate conductive portion 14. Accordingly, it is pointed out that in actuality another protrusion 5 is formed symmetrically at the right side as viewed in FIG. 6 so as to act on the portions 14A and 14B of the opposite end of the bifurcate conductive portion 14. More fully described with reference to FIG. 6, the horizontal surface 51 of the protrusion 5 mates with the lower surface of the portion 14B and the vertical surface 52 of the protrusion 5 mates with the inner surface of the portion 14A, thereby to achieve a positioning function of the portions 14A and 14B of the conductive portion 14. More specifically, the vertical surface 52 serves to position the conductive portion 14 in the horizontal direction, while the horizontal surface 51 serves to position the conductive portion 14 in the vertical direction. Thus, the unitary member including the stator electrode 11, the conductive portion 14 and the stator terminal 12 is insert molded while the same is assuredly and preferably positioned with respect to the stator 1. An L shaped groove 5A is formed in the stator 1 by virtue of the protrusion 5 and the same appears at the portion as denoted by the same reference character 5A in FIG. 5, for example. Accordingly, it follows that a part of the portion 14A extending downward and a part of the portion 14B extending in the horizontal direction of the conductive portion 14 are exposed there.

Although the above described embodiment was described in conjunction with the stator 1 obtained through a molding process of resin, it is pointed out that the stator 1 can be fabricated with ceramic. FIG. 7 shows a perspective view of a disassembled state for explaining a stator 1 fabricated with ceramic. Referring to FIG. 7, a ceramic member 15 having a shape as shown is prepared, an an unitary member including a stator electrode 11, a conductive portion 14 and a stator terminal 12 of substantially the same geometry as described above is placed on the member 15, whereupon both are adhered. Thus, a stator constituting a major portion of the alternative embodiment of the invention is obtained. According to this alternative embodiment, the unitary member including the stator electrode 11 and the like can be positioned with ease on the ceramic member 15.

Although in the above described embodiment the conductive portion 14, having the shape of a fork with two prongs for connecting the stator electrode 11 and the stator terminal 12 is formed in a semicircular shape, the conductive portion 14 need not necessarily be formed along the outer periphery of the stator 1 and need neither be formed from both ends of the stator electrode 11.

As described above, according to the present invention, the strength associated with the stator terminal is increased and an influence of the force being exerted from the stator terminal upon the stator electrode can be remarkably decreased. The structure of the present invention can be advantageously employed in a miniaturized trimmer capacitor, particularly that which is made thin.

Although the present invention has been described and illustrated in detail, it is to be clearly understood that the same is by way of illustration and example only and is not to be taken by way of limitation, the spirit and scope of the present invention being limited only by the terms of appended claims.

What is claimed is:

1. A trimmer capacitor, comprising:
   a stator including a stator electrode and a stator electrode terminal electrically connected to said stator electrode and extending outwardly from said stator so as to provide an external electrical connection to said stator electrode;
   a rotor connected to said stator for rotation about a predetermined axis and including a rotor electrode and a rotor electrode terminal electrically connected to said rotor electrode and extending outwardly from said rotor so as to provide an external electrical connection to said rotor electrode;
   said stator electrode extending from said axis in a first direction generally perpendicular to said axis, said rotor and stator electrodes being spaced apart by a predetermined distance so as to form a capacitance therebetween, which capacitance is variable as a function of the relative angular orientation of said stator and rotor electrodes;
   said rotor further comprising a shaft rotatably provided in said capacitor for rotation about said predetermined axis with respect to said stator and fixedly coupled to said rotor;

said stator being divided into two regions by an imaginary plane including an axis, said stator electrode being formed substantially in one of said regions of said stator;

said stator electrode formed in a fan shape including two ends with the center of said stator electrode being coaxial with the axis of said shaft, said fan shaped stator electrode being formed in said stator close to said rotor, said stator electrode terminal being provided on a surface of said electrode which is further from said rotor; than said stator electrode and said stator electrode terminal extending from said stator in the direction opposite to said region of said stator where said stator electrode is formed and orthogonal to said axis of said shaft, said stator electrode terminal comprising a connection portion for connection of said stator electrode to said stator electrode terminal, said connection portion being bifurcated so as to define a fork having two prongs each of said prongs being connected to a different one of said fan shaped stator electrode ends.

2. A trimmer capacitor in accordance with claim 1, wherein said fan shaped stator electrode is formed on a surface of said stator which is close to said rotor.

3. A trimmer capacitor in accordance with claim 1, wherein said connection portion is connected from and extending in the axial direction from at least one end of said fan shape stator electrode in the direction away from said rotor toward said opposite surface of said stator and further extends in the lateral direction in said opposite direction to said stator electrode terminal.

4. A trimmer capacitor in accordance with claim 1, wherein said stator comprises a resin material insert molded of said stator electrode, said connection portion and said stator electrode terminal.

5. A trimmer capacitor in accordance with claim 4, wherein said stator electrode and said connection portion are formed so as not to protrude beyond the outer periphery of said stator.

6. A trimmer capacitor in accordance wth claim 1, wherein said stator comprises a ceramic material for supporting said stator electrode, said connection portion and said stator electrode terminal.

7. A trimmer capacitor in accordance with claim 1, wherein said stator electrode, said connection portion and said stator electrode terminal are fabricated in an integral member.

8. A trimmer capacitor, comprising:

a stator having a generally planar stator electrode formed thereon and a stator terminal electrically coupled to said stator electrode and extending outwardly from said stator so as to provide an external connection to said stator electrode;

a rotor coupled to said stator for rotation about a predetermined axis, said rotor including a generally planar rotor electrode, said stator and rotor electrodes lying in respective planes which are generally perpendicular to said axis and spaced apart by a predetermined distance so as to form a capacitance therebetween, the magnitude of said capacitance varying as a function of the relative angular orientations of said stator and rotor electrodes, a rotor terminal electrically connected to said rotor electrode and extending outwardly from said rotor so as to provide an external connection to said rotor electrode;

said stator terminal including a generally planar conductive portion located on said stator and lying in a plane parallel to and spaced from said stator electrode, the majority of said stator electrode lying on a first side of a plane including said axis, and the majority of said generally planar conductive portion lying on a second side of said plane;

said stator terminal also including a step portion extending between said generally planar portion and said stator electrode; and said conductive portion including first and second arcuate arms which extend from said step portion to the portion of said stator terminal which extends outward from said stator.

9. The trimmer capacitor of claim 8, wherein said step portion includes first and second generally planar portions extending from respective ones of said arcuate arms to said stator electrode and wherein said first and second planar portions lie in a plane which is parallel to and approximately passes through said axis.

* * * * *